United States Patent
Kuze

Patent Number: 5,177,963
Date of Patent: Jan. 12, 1993

[54] THERMO-ACTUATOR WITH LUBRICANT FILLED SEAL BAG

[76] Inventor: Yoshikazu Kuze, 31-3, Higashimagome 1-chome, Ohta-ku, Tokyo, Japan

[21] Appl. No.: 755,332

[22] Filed: Sep. 5, 1991

[30] Foreign Application Priority Data

Sep. 13, 1990 [JP] Japan .................. 2-241313

[51] Int. Cl.⁵ .................. F16D 31/00; G01K 11/00
[52] U.S. Cl. .................. 60/327; 374/160
[58] Field of Search .................. 60/527, 530, 528; 251/11

[56] References Cited

U.S. PATENT DOCUMENTS

| | | | |
|---|---|---|---|
| 2,913,904 | 11/1959 | Baker | 60/530 |
| 3,149,455 | 9/1964 | Daly et al. | 60/527 |
| 3,308,668 | 3/1967 | Wong | 60/527 |
| 3,397,859 | 8/1968 | Barnett | 60/527 X |
| 3,407,663 | 10/1968 | Vernet | 60/527 |
| 4,016,722 | 4/1977 | Niederer, Sr. | 60/527 X |
| 4,227,412 | 10/1980 | Stratynski et al. | 60/527 |
| 4,235,109 | 11/1980 | Williamson | 60/527 |
| 4,337,621 | 7/1982 | Lane, Jr. et al. | 60/527 |
| 4,759,189 | 7/1988 | Stropkay et al. | 60/527 X |
| 5,033,865 | 7/1991 | Kuze | 60/527 X |

Primary Examiner—John T. Kwon
Assistant Examiner—John Ryznic
Attorney, Agent, or Firm—Beveridge, DeGrandi, Weilacher & Young

[57] ABSTRACT

A guide member is slidably mounted on a rod, and a resilient seal bag around the rod is secured to the guide member. The rod is inserted in a heat conductive cylinder secured to the guide member, and wax is provided in the heat conductive cylinder. The seal bag has a base portion having an opening, and a bag portion, and is engaged with the rod only at the opening to form a gap between the bag portion and the rod. The gap is charged with lubricating oil. The pressure of the lubricating oil is built up to a value equivalent to the pressure of the wax, thereby holding the bag portion in a floating state. The rod is lifted by the pressure of the lubricating oil.

2 Claims, 5 Drawing Sheets

φ3.8

φ4.5

THERMO-ACTUATOR WITH LUBRICANT FILLED SEAL BAG

BACKGROUND OF THE INVENTION

The present invention relates to a thermo-actuator, and more particularly to a thermo-actuator provided in a wax-pellet thermostat for automotive engines and various thermo-sensors.

The thermo-actuator in the wax-pellet thermostat includes a steel rod secured to a housing at a base end thereof, a guide member slidably mounted on the rod, a seal spool secured to the guide member and provided around the rod, a heat conductive cylinder secured to the guide member and exposed to a coolant, a wax provided in the cylinder, and a spring urging the guide member towards the base end of the rod.

When the temperature of the coolant rises in excess of a predetermined value of the thermostat, the wax expands. This forces the seal spool against the steel rod. As the wax squeezes the seal spool around the rod, the cylinder moves outwardly together with the guide member against the spring, thereby opening a valve. When the thermostat cools, the wax contracts, so that the seal spool expands, and the cylinder is moved to the base end of the rod by the spring.

In an ordinary thermostat having a valve opening lift of 10 mm, the pressure of the wax for lifting the valve becomes very high as 102 kg/cm$^2$. To resist the high pressure and to ensure the durability, the seal spool is made to have a large thickness, for example 45% of the diameter of the rod. Therefore, in order to squeeze and deform the thick and stiff seal spool, a large force of 30 kg/cm$^2$ for 102 kg/cm$^2$ is consumed. In addition, there occur troubles, such as wear and tear of the seal spool, and sticking of the spool to the rod, because of large friction.

SUMMARY OF THE INVENTION

According to the present invention, there is provided a thermo-actuator having an actuating rod, a guide member slidably mounted on the actuating rod, a resilient seal bag provided around the rod and hermetically secured to the guide member, a heat conductive cylinder housing the seal bag and the rod and secured to the guide member, and wax provided in the heat conductive cylinder to enclose the seal bag.

The seal bag has a base portion having an opening, and a bag portion defining a hollow, and being engaged with the rod only at the opening to form a gap between the bag portion and the rod, and the gap is charged with lubricating oil.

The bag portion has a thickness between 25% and 1% of the diameter of the rod, so that the pressure of the lubricating oil is built up to a value equivalent to the pressure of the wax, thereby holding the bag portion in a floating state.

When the wax expands with an increase of ambient temperature, the pressure of the lubricating oil equivalent to the pressure causes to raise the rod.

Since the bag portion is in a floating state between the wax and the lubricating oil, the bag portion does not participate in lifting the rod. Therefore, thickness of the seal bag can be reduced, and time of the seal bag is elongated. Because of the thin thickness of the seal bag, the diameter of the heat conductive cylinder can be reduced, and the diameter of the rod can be increased.

On the other hand, the pressure of the wax necessary for lifting the rod decreases in reverse proportion to the square to the diameter of the rod. Consequently, the pressure of the wax and hence the pressure of the lubricating oil reduce largely with the increase of the diameter of the rod. Therefore, the life time of the seal bag can be further increased.

An object of the present invention is to provide a thermo-actuator comprising a resilient seal bag covering a rod and a lubricating oil provided in a gap between the seal bag and the rod, where the rod is relatively moved with respect to a guide member by pressure of the lubricating oil equivalent to the pressure of wax, without contacting the seal bag with the rod.

Another object of the present invention is to provide a thermo-actuator where a resilient seal bag provided around a rod has a very small thickness, thereby reducing the size and weight of the thermo-actuator and elongating the life time of the thermo-actuator.

These and other objects and features of the present invention will become more apparent from the following detailed description with reference to the accompanying drawings.

DETAILED DESCRIPTION OF THE PREFERRED EMBODIMENTS

Figure 1:
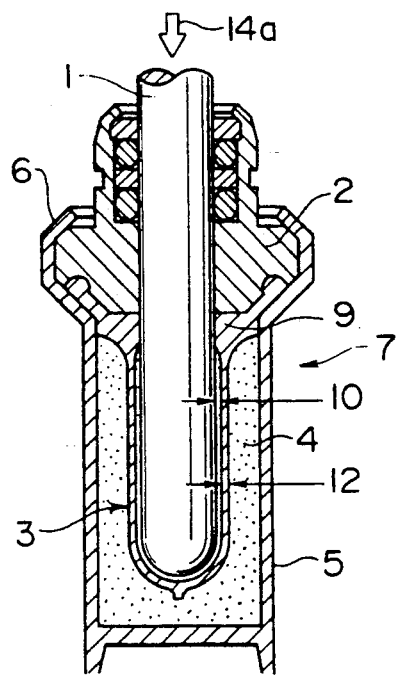
FIG. 1 is a sectional view of a thermo-actuator for a thermostat according to the present invention.

FIG. 1 shows a thermo-actuator of the present invention to be mounted in a thermostat of an engine cooling system for a motor vehicle. The thermo-actuator comprises an actuating steel rod 1, a guide member 2 slidably mounted on the rod 1, and a resilient seal bag 3 hermetically secured to the guide member 2. The seal bag 3 is inserted in a heat conductive cylinder 5 filled with wax pellet 4. An axial seal device 13 is provided between the guide member 2 and the rod 1 so as to prevent the lubricating oil from leaking out of the seal bag and, foreign material from entering in the seal bag 3. An upper end 6 of the cylinder 5 is securely engaged with the guide member 2, thereby forming the thermo-actuator 7.

Figure 4:
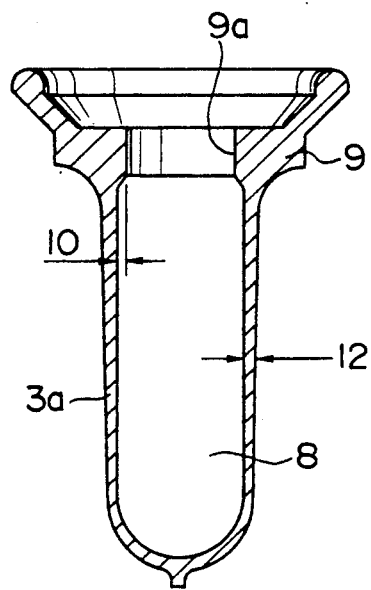
FIG. 4 is a sectional view of the seal bag.

The seal bag 3 comprises a bag portion 3a defining a hollow 8 and a base portion 9 having an opening 9a as shown in FIG. 4. The seal bag 3 engages with the rod 1 only at the opening 9a with a gap 10 between the bag portion 3a and the rod. The gap 10 is filled with lubricating oil 11. The thickness of the bag portion 3a is reduced to a very small value. The thickness, for example, is between 25% and 1% of the diameter of the rod. The gap 10 has a width approximately equal to the thickness 12 of the seal bag.

Figure 2:
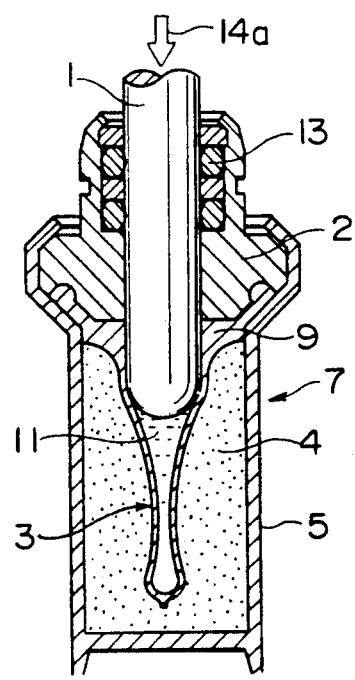
FIG. 2 is a sectional view of the thermo-actuator in a compression state of a resilient seal bag.
Figure 3:
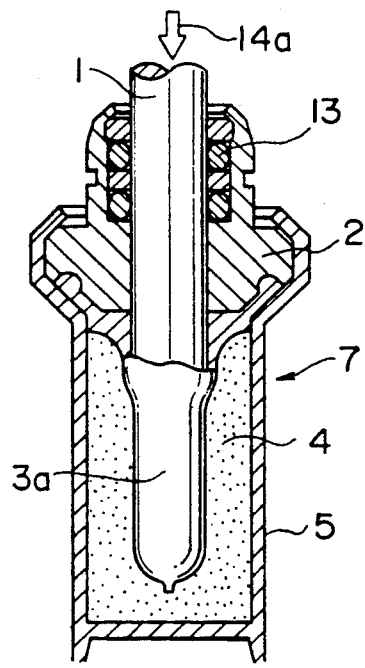
FIG. 3 is a sectional side view of the thermo-actuator of FIG. 2.

When the wax 4 expands with an increase of ambient temperature, the pressure of the lubricating oil 11 increases to a value equivalent to the pressure of the wax. The pressure of the lubricating oil acts to raise the rod 1 accordingly. FIG. 2 shows the condition where the rod 1 is raised to a maximum lift position. In accordance with the present invention, the rod is lifted by the pressure of the lubricating oil 11, and hence the bag portion 3a is in a floating state between the wax 4 and the lubricating oil which are balanced in pressure. Therefore, the bag portion 3a does not participate in lifting the rod.

When the ambient temperature decreases, the wax 4 contracts. Accordingly, the rod 1 is lowered by a resilient force 14a of a spring (not shown) to the initial position of FIG. 1.

Figure 5:
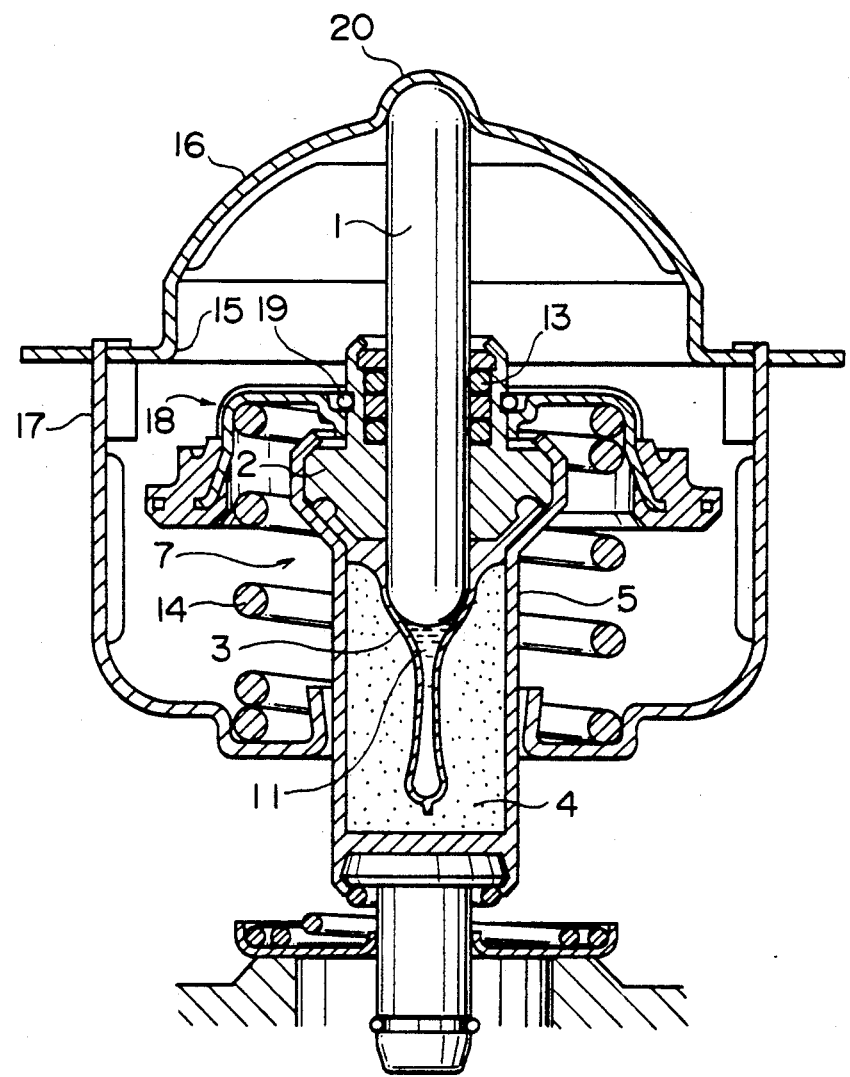
FIGS. 5 and 6 are sectional views of a thermostat provided with the thermo-actuator of the present invention.

FIG. 5 shows the thermostat having the thermo-actuator of the present invention, which is provided for a cooling system of an automotive engine.

The thermostat has a housing 16 secured to a wall of a coolant passage of the engine, and a frame 17 secured to the housing 16. The housing 16 has a valve seat 15. The steel rod 1 of the thermo-actuator of the present invention is secured to the housing 16 at a top portion 20, and a primary valve 18 is secured to the guide member 2. A return coil spring 14 disposed surrounding the cylinder 5 is provided between the primary valve 18 and the bottom of the frame 17. A snap ring 19 is engaged with the guide member 2 for securing the primary valve 18 to the guide member 2.

Figure 6:
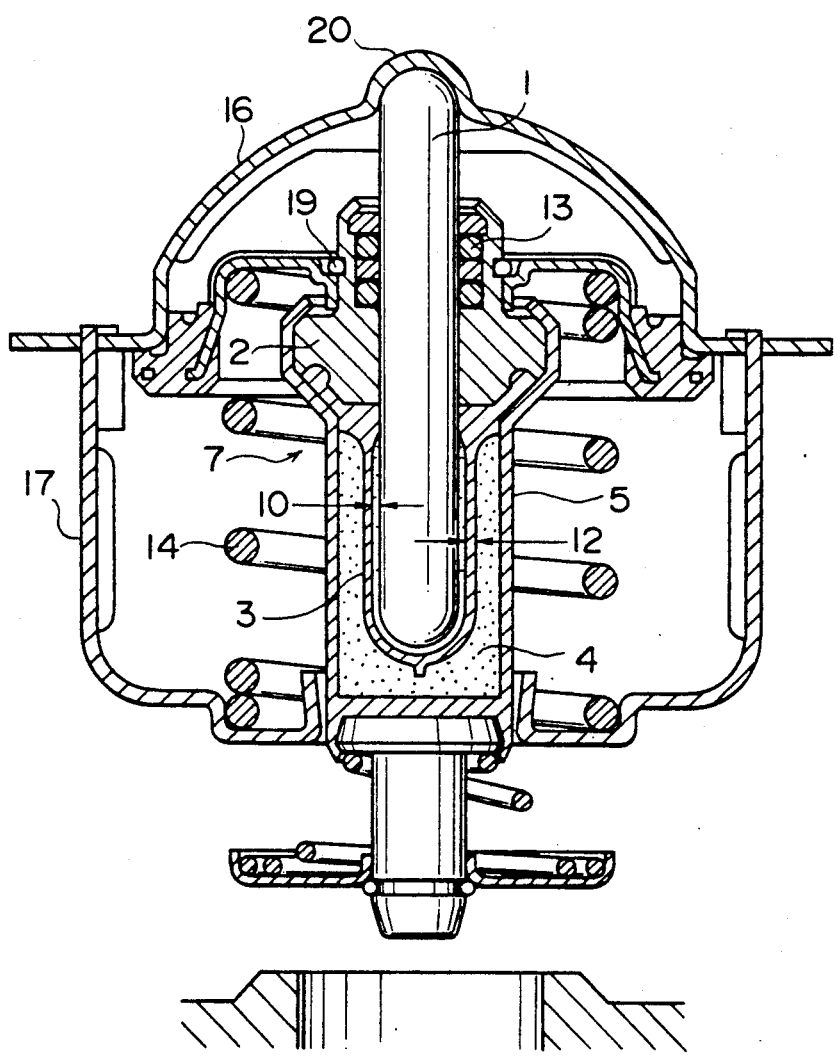

FIG. 6 shows the vlave in the closed state. When the temperature of the coolant rises in excess of a predetermined value of the thermostat, the expansion of the wax 4 causes the pressure of the lubricating oil to increase up to a value equivalent to the pressure of the wax 4. The pressure of the lubricating oil is exerted on the rod 1 to urge it upwardly. Since the rod 1 is secured, the cylinder 5 of the thermo-actuator is downwardly moved against the force of the spring 14, thereby opening the primary valve 18 as shown in FIG. 5.

When the coolant temperature reduces, the wax 4 contracts. Thus, the coil spring 14 causes the valve 18 to raise to the closed position as shown in FIG. 6.

Figure 8:
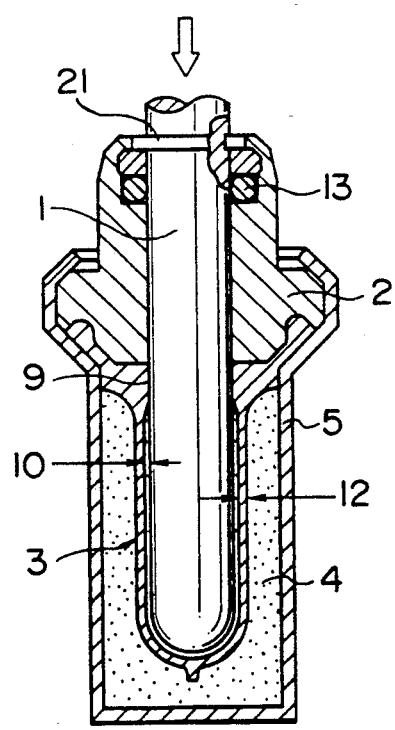
FIG. 8 is a sectional view of another example of the thermo-actuator of the present invention.

FIG. 8 shows a thermo-actuator for general use. A snap ring 21 is engaged with an annular groove of the rod 1 so as to determine the gap between the lower end of the rod 1 and the bottom of the seal bag 3. The upper end of the rod 1 is operatively connected to a device to be actuated.

In accordance with the present invention, the resilient seal bag does not participate in moving the rod. Therefore, the thickness of the seal bag can be the life time of the seal bag is very elongated over five times that of the conventional seal spool.

Because of the very thin thickness of the seal bag, the diameter of the heat conductive cylinder can be reduced. The more the diameter of the cylinder becomes small, the more the strength of the cylinder increases. As a result, the thickness of the wall of the cylinder can be reduced, which causes an increase of thermo-sensitivity and reduction of the thermo-actuator in size and weight. To the contrary, the diameter of the rod can be increased.

On the other hand, the pressure of the wax necessary for lifting the rod decreases in reverse proportion to the square to the diameter of the rod. Consequently, the pressure of the wax and hence the pressure of the lubricating oil reduce largely with the increase of the diameter of the rod. This also elongates the life time of the seal bag.

Durability tests of the thermo-actuators were conducted as follows.

A. Seal bag of present invention
  Diameter of rod: 4.5 mm
  Thickness of seal spool: 0.2 mm
  Thickness rate to rod: 4.44%
B. Conventional seal spool
  Diameter of rod: 3.8 mm
  Thickness of seal spool: 1.7 mm
  Thickness rate to rod: 44.7%
C. Specification of test machine
  At lifting of the rod of 10 mm,
    Spring load on the rod: 11.5 kg
    Cycle time: 6 seconds
      On: 3 seconds  OFF: 3 seconds
D. Result
  a. Thermo-actuator of present invention
    Pressure for lifting the rod of 10 mm: about 72 kg/cm$^2$
    Slight pressure of 0.4 kg/cm$^2$ for the whole pressure of 72 kg/cm$^2$ was consumed for deforming the seal bag.
    Life time: No defects were found at 200,000 cycles.
  b. Conventional thermo-actuator
    Pressure for lifting the rod of 10 mm: about 102 kg/cm$^2$
    Pressure of about 30 kg/cm$^2$ for the whole pressure of 102 kg/cm$^2$ was consumed for deforming and squeezing the seal spool.
    Life time: about 40,000 cycles Although the thermo-actuators are the same in performance, energy consumption of the thermo-actuator of the present invention is smaller than the conventional one by 30 kg/cm$^2$, and the life time of the former is over five times that of the latter. Furthermore, the pressure of the wax reduces 30% of that of the conventional one by slightly increasing the diameter of the rod by 0.7 mm.

Figure 7A:
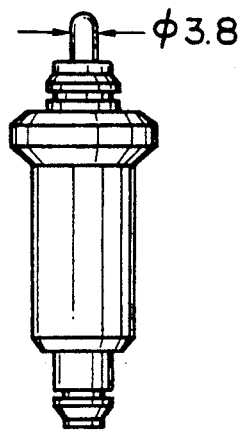
FIGS. 7a and 7b show a conventional thermo-actuator and a thermo-actuator of the present invention in full-scale.
Figure 7B:
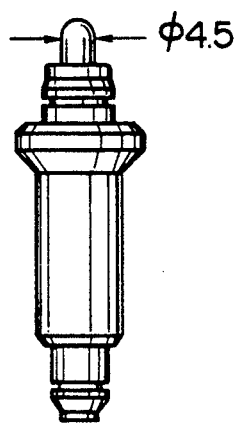

FIG. 7a shows a thermo-actuator provided with a conventional seal spool, and FIG. 7b shows a thermo-actuator having a seal bag of the present invention in full-scale, which have the same performance. The rod of FIG. 7a has a diameter of 3.8 mm, and the rod of FIG. 7b has a larger diameter of 4.5 mm in spite of the thermo-actuator having a smaller size than FIG. 7a.

While the invention has been described in conjunction with preferred specific embodiment thereof, it will be understood that this description is intended to illustrate and not limit the scope of the invention, which is defined by the following claims.

What is claimed is:

1. The thermo-actuator having an actuating rod, a guide member slidably mounted on the actuating rod, a resilient seal bag provided around the rod and hermetically secured to the guide member, a heat conductive cylinder housing the seal bag and the rod and secured to the guide member, and wax provided in the heat conductive cylinder to enclose the seal bag, the improvement comprising:

the seal bag having a base portion having an opening, and a bag portion defining a hollow, and being engaged with the rod only at the opening to form a gap between the bag portion and the rod;
   the gap filled with lubricating oil;
   the bag portion having a thickness between 25% and 1% of the diameter of the rod, so that the pressure of the lubricating oil is built up to a value equivalent to the pressure of the wax, thereby holding the bag portion in a floating state and lifting the rod by the pressure of the lubricating oil.

2. The thermo-actuator according to claim 1 wherein the gap has a width approximately equal to the thickness of the bag portion.

* * * * *